(12) United States Patent
Qin

(10) Patent No.: US 12,164,107 B2
(45) Date of Patent: Dec. 10, 2024

(54) TOTAL REFLECTION BASED COMPACT NEAR-EYE DISPLAY DEVICE WITH LARGE FIELD OF VIEW

(71) Applicant: BEIJING ANTVR TECHNOLOGY CO., LTD., Beijing (CN)

(72) Inventor: Zheng Qin, Beijing (CN)

(73) Assignee: BEIJING ANTVR TECHNOLOGY CO., LTD., Beijing (CN)

( * ) Notice: Subject to any disclaimer, the term of this patent is extended or adjusted under 35 U.S.C. 154(b) by 591 days.

(21) Appl. No.: 17/371,230

(22) Filed: Jul. 9, 2021

(65) Prior Publication Data

US 2021/0333557 A1  Oct. 28, 2021

Related U.S. Application Data

(63) Continuation of application No. PCT/CN2020/081049, filed on Mar. 25, 2020.

(30) Foreign Application Priority Data

Mar. 29, 2019 (CN) .......................... 201910249097.2

(51) Int. Cl.
*G02B 27/01* (2006.01)
*G02B 5/04* (2006.01)

(52) U.S. Cl.
CPC ........... *G02B 27/0172* (2013.01); *G02B 5/04* (2013.01); *G02B 2027/0123* (2013.01)

(58) Field of Classification Search
CPC ................. G02B 27/0172; G02B 5/04; G02B 2027/0123; G02B 17/0884; G02B 17/0856; G02B 27/0081; G02B 17/02
See application file for complete search history.

(56) References Cited

U.S. PATENT DOCUMENTS

| | | | |
|---|---|---|---|
| 6,222,677 B1 † | 4/2001 | Budd | |
| 2012/0242561 A1 † | 9/2012 | Sugihara | |
| 2013/0187836 A1 † | 7/2013 | Cheng | |
| 2013/0229705 A1 † | 9/2013 | Suzuki | |
| 2016/0103306 A1 | 4/2016 | Takahashi | |

FOREIGN PATENT DOCUMENTS

| | | |
|---|---|---|
| CN | 101256285 A | 9/2008 |
| CN | 102692707 A | 9/2012 |
| CN | 103201666 A | 7/2013 |
| CN | 105589202 A | 5/2016 |
| CN | 105659147 A | 6/2016 |
| CN | 106773058 A | 5/2017 |
| CN | 206270592 U | 6/2017 |

(Continued)

OTHER PUBLICATIONS

International Search Report of PCT/CN2020/081049, Jul. 1, 2020.

*Primary Examiner* — Ryan D Howard
(74) *Attorney, Agent, or Firm* — Locke Lord LLP; Tim Tingkang Xia, Esq.

(57) ABSTRACT

Disclosed is a total reflection based compact near-eye display device with a large field of view. Light rays emitted by an image source (103) are transmitted by using a total reflection prism (101), and are finally subjected to image magnification by means of a near-eye refractive component (105), such that a near-eye display effect with a large field of view is achieved under the conditions of a compact volume.

8 Claims, 15 Drawing Sheets

(56) References Cited

FOREIGN PATENT DOCUMENTS

| CN | 107024769 | A | † | 8/2017 |
| CN | 108072975 | A | | 5/2018 |
| CN | 110045503 | A | | 7/2019 |
| EP | 1808722 | A2 | | 7/2007 |
| JP | 5242477 | B2 | | 7/2013 |

† cited by third party

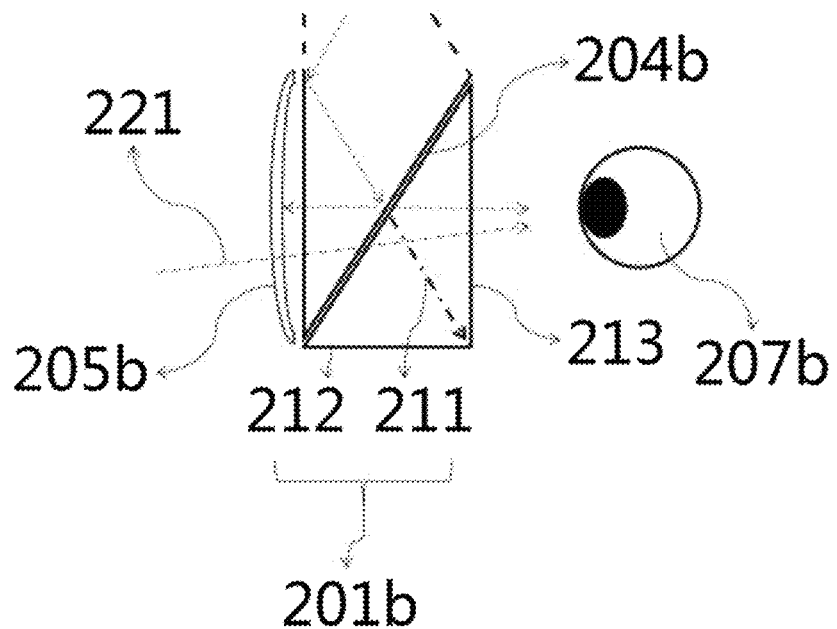
FIG. 2b
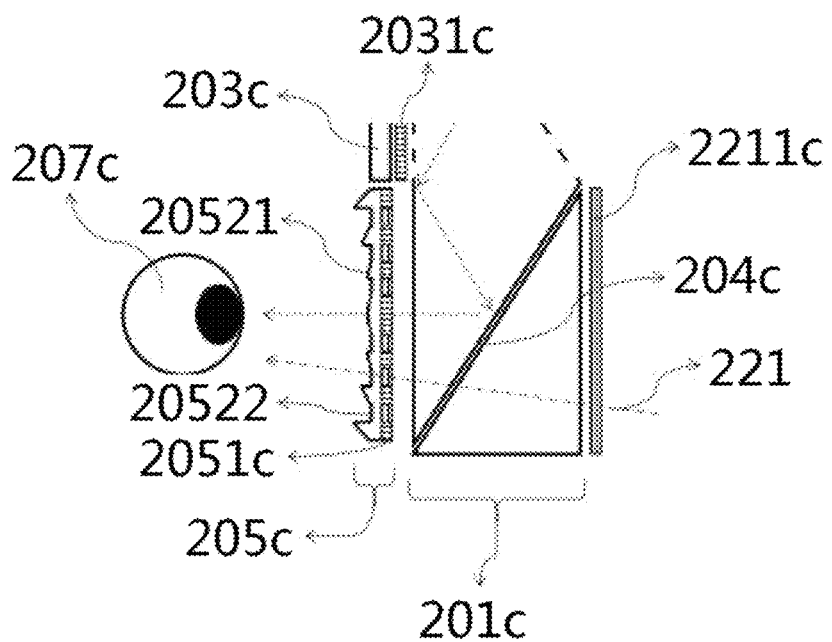
FIG. 2c1

FIG. 2c2

TOTAL REFLECTION BASED COMPACT NEAR-EYE DISPLAY DEVICE WITH LARGE FIELD OF VIEW

CROSS-REFERENCE TO RELATED PATENT APPLICATION

This application is a continuation application of International Patent Application No. PCT/CN2020/081049, filed on Mar. 25, 2020, which itself claims priority to and the benefit of Patent Application Serial No. CN201910249097.2, filed in China on Mar. 29, 2019. The disclosure of each of the above applications is incorporated herein in its entirety by reference.

TECHNICAL FIELD

The application relates to the field of near-eye display devices, in particular to a compact near-eye display device with a large field of view angle based on total reflection.

BACKGROUND

In the near-eye display system, in order to form a large field of view angle display effect, generally, a large-aperture imaging system is needed, and the focal length of the large-aperture imaging system is generally not too small, which represents the axial thickness of the near-eye display device. Therefore, it is not easy to manufacture a slim and compact glasses display with a large field of view angle under the current industrial situation.

On the basis of keeping the larger aperture of the imaging system, the total reflection prism is used to conduct one or more times of total reflection on the light emitted by the image source, so as to extend the light propagation path, and finally, the near-eye refractive component is used for image amplification, thus realizing the near-eye display effect with a larger field of view angle, while maintaining the overall sheet shape of the device, which is more suitable for manufacturing thin and portable glasses display products.

SUMMARY

The application provides a compact near-eye display device with a large field of view angle, which adopts a total reflection prism and a near-eye refractive component and realizes a large field of view angle by means of total reflection conduction and end amplification.

According to the technical scheme of the invention, a compact near-eye display device with a large field angle based on total reflection utilizes a total reflection prism to conduct one or more times of total reflection on light emitted by an image source, and finally performs image amplification through a near-eye refractive component, so that the near-eye display effect with a large field angle is realized in a compact volume.

Preferably, the primary reflection surface forms an included angle of about 30 degrees with the image source, while the secondary reflection surface forms an included angle of about 30 degrees with the near-eye refractive component; the image source and the near-eye refractive component are placed in parallel, and a gap layer exists between the image source and the near-eye refractive component and the total reflection prism, and the gap layer contains substances (e.g., air) with a refractive index lower than that of the total reflection prism, so that light can be totally reflected and transmitted on an inner surface of the total reflection prism.

Preferably, the image source is one or more imaging light-emitting devices selected from a liquid crystal display, a light-emitting diode display, an organic light-emitting diode display, a reflective display, a diffractive light source, a projector, a beam generator, a laser and a light modulator.

Preferably, the near-eye diopter adopts a positive focal length lens, a reflective diopter, a polarized bifocal lens, a refractive reflective diopter or a polarized double reflective diopter.

Preferably, the near-eye refractive component allows external light to pass through without diopter, and the secondary reflection surface is semi-reflective (e.g., a semi-reflective film, a polarization splitting layer or an air layer), so that a human eye can see external environment through the near-eye refractive component and the total reflection prism while seeing the displayed image clearly, thereby realizing the semi-transparent display effect of augmented reality.

Preferably, the total reflection prisms have different shapes, and can generate total reflection once, twice or three times in the process of transmitting light, thereby forming different total reflection optical systems.

Preferably, the compensation surface of the total reflection prism facing away from the near-eye refractive component adopts a curved surface (spherical surface, aspheric surface or other curved surfaces), so as to generate a certain refractive power, which can be matched with the refractive surface of the near-eye refractive component, thereby performing refractive adjustment on the internal display light and the external environment light, and being suitable for users with different eyesight.

Preferably, the near-eye display device is combined by two sets of total reflection optical systems, which are respectively placed in front of human eyes, and the two sets of total reflection optical systems project light from different directions, and finally, two displayed images are spliced to achieve a larger field of view angle display effect.

Preferably, the near-eye display device adopts the combination of two sets of total reflection optical systems, which are overlapped and placed in front of human eyes; the polarization states of the two sets of total reflection optical systems are different, and the two paths of light come from different areas of the same image source; through different combinations of polarization splitting layers or polarization filters, the optical paths of the two sets of optical systems do not interfere with each other; finally, the two display images are spliced to achieve a larger field of view angle display effect.

Preferably, the near-eye display device adopts the combination of two sets of total reflection optical systems, which are overlapped and placed in front of human eyes; the polarization states of the two sets of total reflection optical systems are different, and the two paths of light come from different times in the same area of the same image source (need to be combined with a fast switching polarization filter or a fast switching shutter); through different combinations of polarization splitting layers or polarization filters, the optical paths of the two sets of optical systems do not interfere with each other, and finally, the two displayed images are spliced to achieve a larger field of view angle display effect.

The application has the beneficial effects that the compact near-eye display device with a large field of view angle based on total reflection is disclosed, and the light emitted by an image source is totally reflected and transmitted for one or more times by a total reflection prism, and finally the image is amplified by a near-eye refractive component, so that the near-eye display effect with a large field of view angle is realized in a compact volume.

It should be understood that both the foregoing general description and the following detailed description are exemplary illustrations and explanations, and should not be used as limitations on what is claimed in the present invention.

BRIEF DESCRIPTION OF THE DRAWINGS

Further objects, functions and advantages of the present application will be elucidated by the following description of embodiments of the present application with reference to the accompanying drawings, in which:

FIG. 2a to FIG. 2f are specific structural diagrams showing different types of total reflection prisms and near-eye refractive components in the compact near-eye display device with a large field of view angle based on total reflection according to the first embodiment of the present invention.

DETAILED DESCRIPTION

Figure 1:
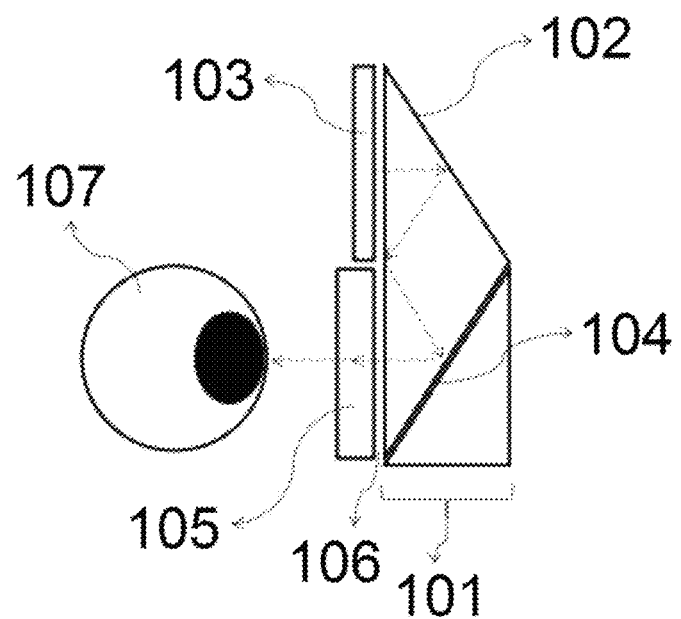
FIG. 1 schematically shows a structure diagram of a compact near-eye display device with a large field of view angle based on total reflection.

By referring to exemplary embodiments, the objects and functions of the present application and methods for achieving these objects and functions will be elucidated. However, the present application is not limited to the exemplary embodiments disclosed below; It can be realized in different forms. The essence of the description is only to help those skilled in the relevant fields comprehensively understand the specific details of the invention.

Hereinafter, embodiments of the present application will be described with reference to the drawings. In the drawings, the same reference numerals represent the same or similar components, or the same or similar steps.

FIG. 1 schematically shows a structure diagram of a compact near-eye display device with a large field of view angle based on total reflection. As shown in FIG. 1, a compact near-eye display device with a large field of view angle based on total reflection includes a total reflection prism 101, in which a primary reflection surface 102 forms an angle of about 30 with an image source 103, a secondary reflection surface 104 forms an angle of about 30 with a near-eye refractive component 105, and the image source 103 and the near-eye refractive component 105 are placed in parallel with each other. There is a gap layer 106, and the gap layer 106 contains a substance (such as air) with a refractive index lower than that of the total reflection prism 101, so that light can be totally reflected and transmitted on the inner surface of the total reflection prism 101.

The light emitted from the total reflection prism 101 is magnified by the near-eye refractive component 105, which can be clearly seen by the human eye 107, thus realizing the near-eye display effect with a large field of view angle in a compact volume.

The image source 103 is a liquid crystal display, a light emitting diode display, an organic light emitting diode display, a reflective display, a diffractive light source, a projector, a beam generator, a laser, a light modulator, etc.

Example 1

FIG. 2a to FIG. 2f are specific structural diagrams showing different types of total reflection prisms and near-eye refractive components in the compact near-eye display device with a large field of view angle based on total reflection according to the first embodiment of the present invention.

In this embodiment, the light emitted by the image source is reflected by the secondary reflection surface, and then enters the near-eye refractive component for image amplification, and finally enters the human eye, thereby realizing the near-eye display effect with a large field of view in a compact volume.

Figure 2A:
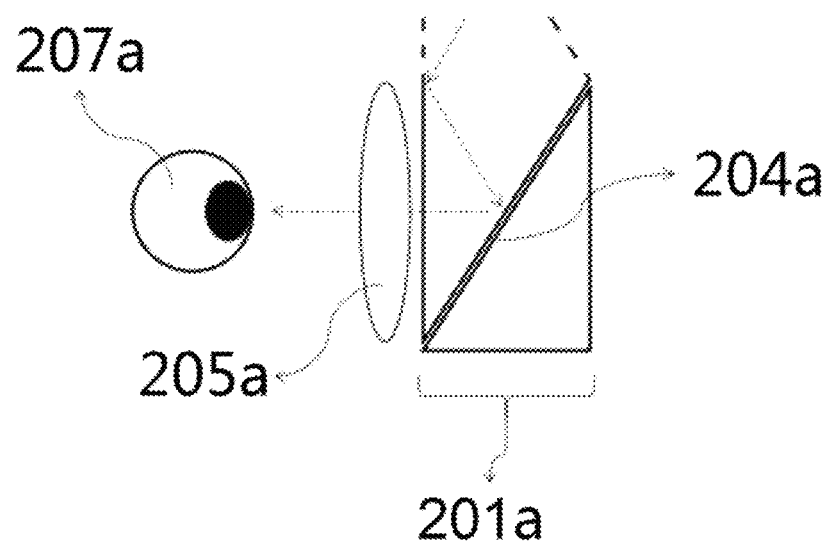

As shown in FIG. 2a, the near-eye refractive component may adopt a positive focal length lens 205a.

As shown in FIG. 2b to FIG. 2e, the near-eye refractive component can allow external ambient light 221 to pass through without diopter, and the secondary reflection surface is semi-reflective (such as semi-reflective film, polarization splitting layer, or air layer), so that the human eye can see the external environment through the near-eye refractive component and total reflection prism while seeing the displayed image clearly, thus realizing the semi-transparent display effect of augmented reality.
Specifically:

As shown in FIG. 2b, the near-eye diopter can adopt a reflective diopter 205b. Preferably, in order to prevent the transmitted light 211 after passing through the secondary reflection surface 204b, it is reflected at the end surface 212, and then reflected by the secondary reverse surface to enter the human eye again, resulting in stray light. There are the following solutions:
(1) the end face 212 adopts anti-reflection film to prevent light from reflecting on the inner surface;
(2) the end face 212 adopts a surface treatment method to prevent light reflection;
(3) an anti-reflection film is added on the near-eye surface 213 to prevent light from being totally reflected on the inner surface, thus avoiding stray light;
(4) the secondary reflection surface 204b adopts a polarizing beam splitter, so that the light transmitted through it will still be completely transmitted when it is reflected back later, and will not be reflected at the secondary reflection surface 204b; at this time, in order to ensure that the light reflected by the reflective diopter 205b can pass through the secondary reflection surface 204b, a polarization changer (such as a depolarization film, a quarter-wave plate, a half-wave plate, a 45-degree polarizing plate, etc., which can change the linear polarization of the original light) should be added to the reflective diopter 205b to process the light, and then it can be smoothly reflected into the human eye 207b.

As shown in FIG. 2c, the near-eye refractive component may adopt a polarized bifocal lens. Said polarization bifocal lens adopts polarization bifocal lens 205c with fine structure, which includes orthogonal polarization mixed filter 2051c and is matched with special lens with fine structure. There are two different types of A/B surface elements mixed on the surface of this special lens, among which:

Class-A surface 20521: if the local refractive index of the fine structure conforms to the refractive law of the short-focus positive lens, the covered small-area polarization filter corresponding to its surface only allows the display light (which has been processed into polarized light by the display light polarizer 2031c) to pass through;

Class-B surface 20522: if the fine structure has no diopter (or only slight diopter adapted to the user's vision), the small-area polarization filter covered on its surface only allows the external ambient light (which has been processed into polarized light by the external light polarizer 2211c) to pass through.

As shown in FIG. 2c2, there are several examples of the arrangement forms of A/B surface elements: A/B interval ring belt (fresnel-like lens structure), interval stripes, checkerboard grid, dot matrix (arranged in a large area together with b area with a round and near-round surface of class A), A/B interval equilateral triangle array, etc.

In addition, the polarized bifocal lens with diffractive microstructure can also achieve different focal lengths for light with different polarizations (the focal length for internal display light is positive short focus, and the focal length for external ambient light is nearly infinite).

Figure 2D:
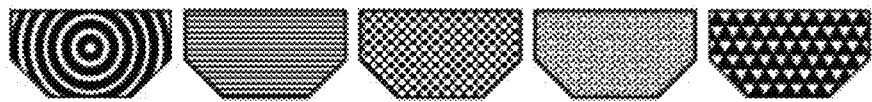
Figure 2D:
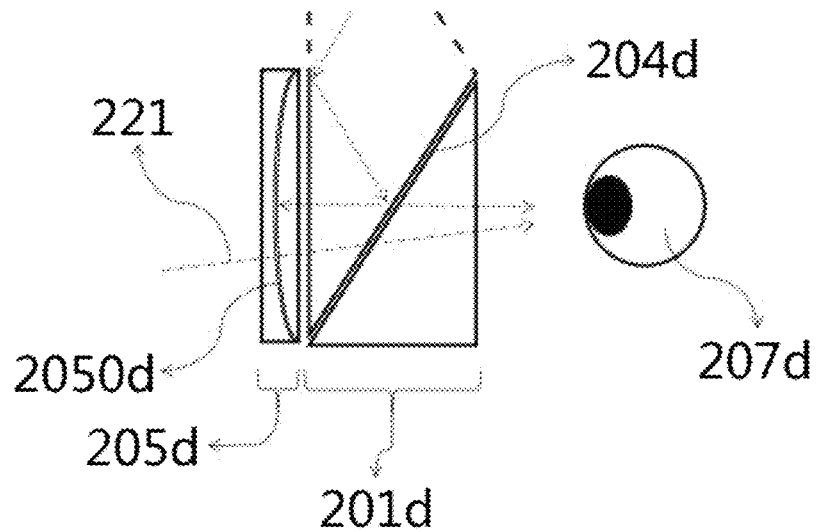

As shown in FIG. 2d, the near-eye refractive component may adopt a refractive-reflective diopter 205d. Advantageously, in order to further reduce the thickness of the near-eye refractive component, the semi-reflective surface 2050d in the figure can be a Fresnel reflective surface, or a reflection diffraction microstructure can be adopted to refract the internal display light while allowing the external light to pass through without refraction.

Figure 2E:
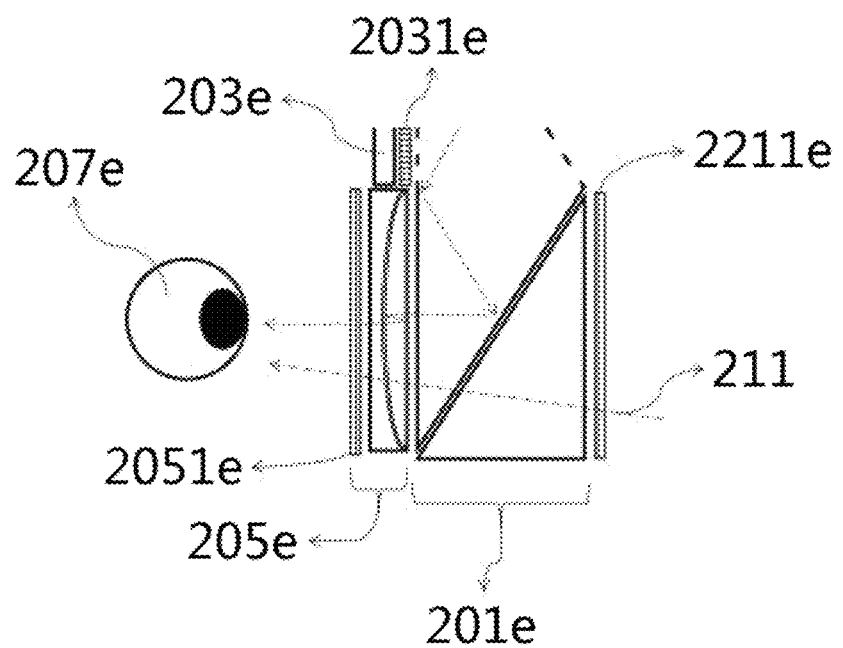

As shown in FIG. 2e, the near-eye refractive component can adopt a polarization double-reflection refractive device 205e. With respect to the display light emitted by the image source 203e, after being processed by the display light polarizer 2031e, it becomes a kind of polarized light, which cannot pass directly after entering the polarization double-reflective diopter 205e and will be blocked by the end polarization filter 2051e. The light rays are reflected twice on two surfaces of the diopter. Since the two surfaces are not parallel but have a certain relative curvature, the two reflections bring about refractive magnification (which can make the human eye see clearly). The light finally emitted after two reflections can pass through the terminal polarizing filter 2051e and be seen by the human eye 207e.

The external ambient light 211 is processed by the external light polarizer 2211e, and becomes another polarized light, which can directly pass through the end polarization filter 2051e when entering the polarization double-reflection type diopter 205e. Since there is no refractive reflection and refraction, the human eye 207e can directly see the external light. The light is reflected twice on two surfaces of the diopter, and is also magnified by refraction (which makes the human eye unable to see clearly), but it cannot pass through the terminal polarizing filter 2051e, so it cannot be seen by the human eye 207e.

Figure 2F:
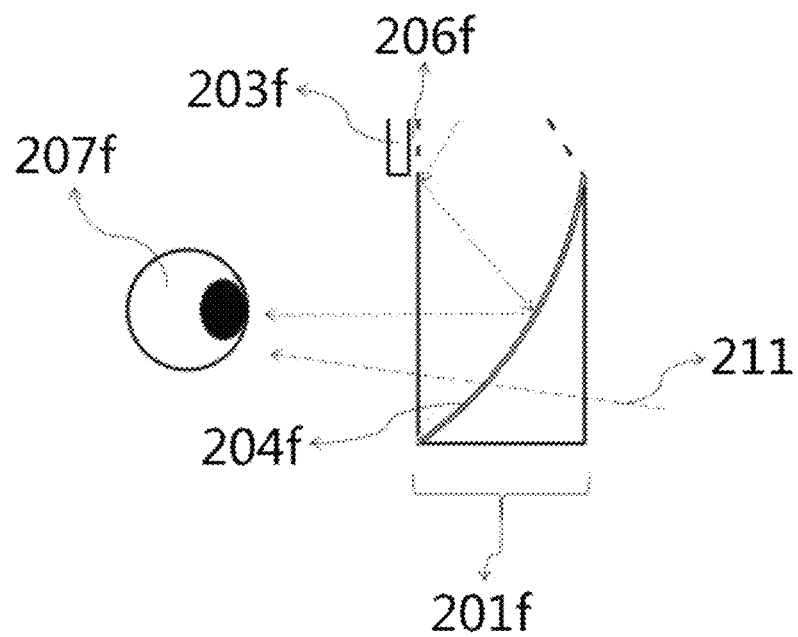

As shown in FIG. 2f, a curved secondary reflection surface 204f is adopted, which has near-eye refractive function. Therefore, a separate near-eye refractive component is no longer needed.

Example 2

FIG. 3a to FIG. 3f are schematic structural diagrams showing different types of total reflection optical systems in the compact near-eye display device with a large field of view angle based on total reflection according to the second embodiment of the present invention.

In this embodiment, the total reflection prism 301 has different shapes, and the light emitted by the image source can be totally reflected once, twice, or three times in the process of transmitting the light, thereby forming different total reflection optical systems.

Figure 3A:
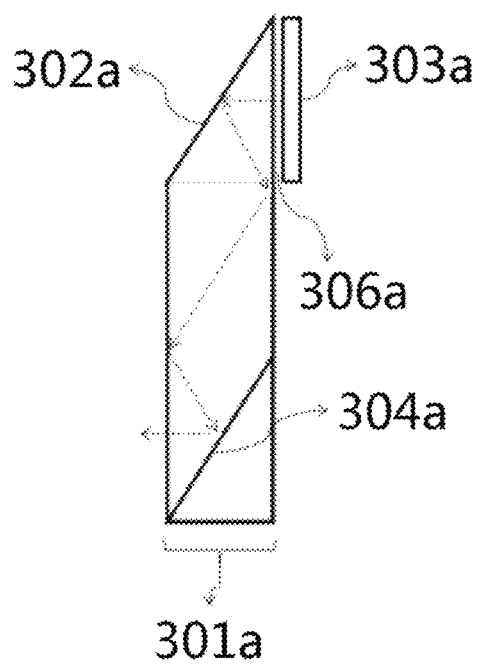
FIG. 3a to FIG. 3f are schematic structural diagrams showing different types of total reflection optical systems in the compact near-eye display device with a large field of view angle based on total reflection according to the second embodiment of the present invention.

As shown in FIG. 3a, the light is totally reflected twice.

Figure 3B:
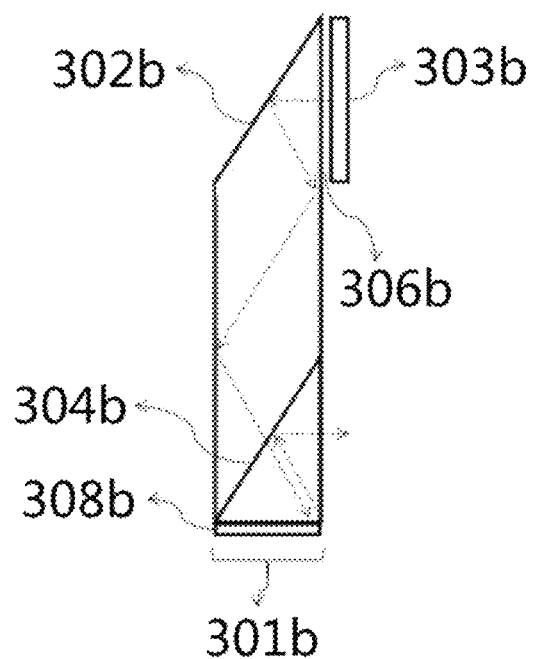

As shown in FIG. 3b, the light is totally reflected three times and reflected by the end reflection surface 308b.

Figure 3C:
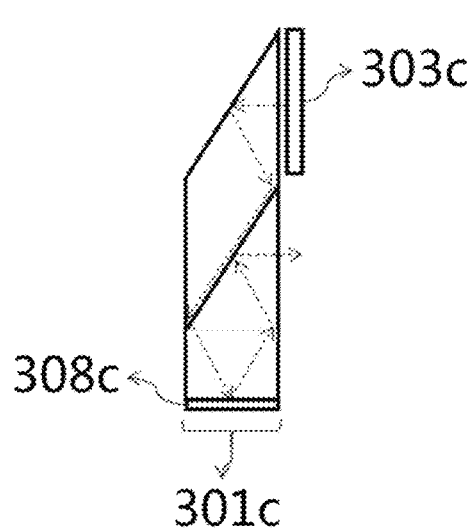

As shown in FIG. 3c, the light is totally reflected three times and reflected by the end reflection surface 308c.

Figure 3D:
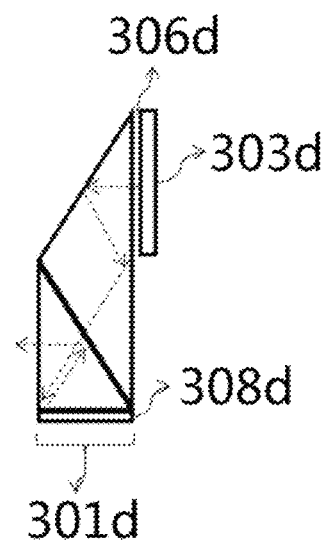

As shown in FIG. 3d, the light is totally reflected twice and reflected by the end reflection surface 308d.

Figure 3E:
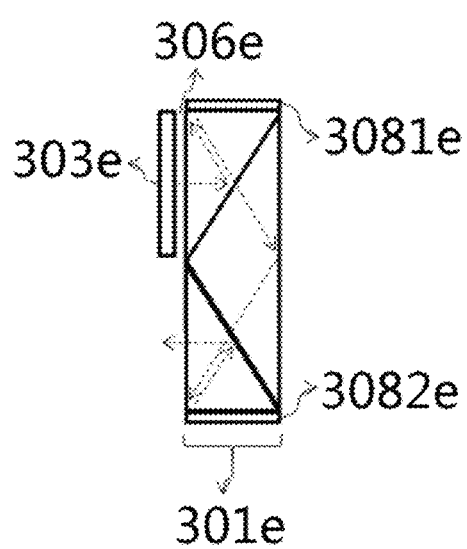

As shown in FIG. 3e, the light is totally reflected three times and reflected by the end reflection surface 3081e and the end reflection surface 3082e.

Figure 3F:
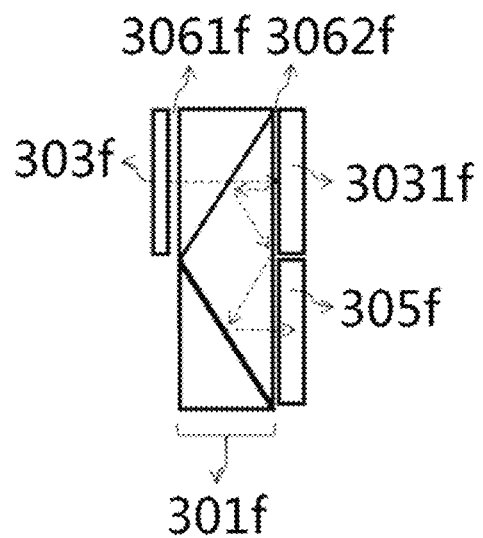

As shown in FIG. 3f, the light is reflected by the reflecting refractive component 3031f at the light source end, enlarged or reduced, then transmitted, and then subjected to secondary refraction by the near-eye refractive component 305f, finally becoming the light that can be seen clearly by human eyes. With this structure, the optical system can be allowed to preprocess the light emitted by the image source (for example, enlarging the light can save space and increase the field of view angle, and reducing the light can improve the definition), thus being more suitable for various use requirements.

Example 3

Figure 4A:
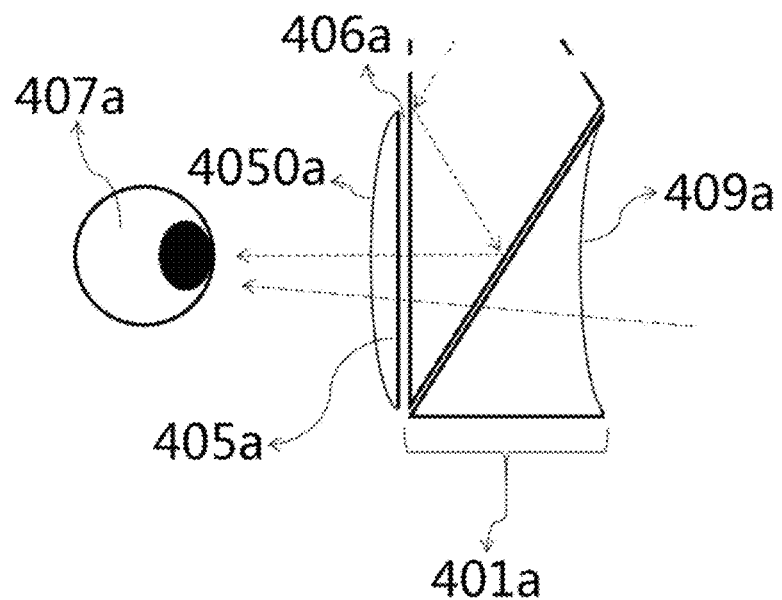
FIG. 4a to FIG. 4b are schematic diagrams showing that the total reflection prism in the compact near-eye display device with a large field of view angle based on total reflection according to the third embodiment of the present application includes a compensation surface.
Figure 4B:
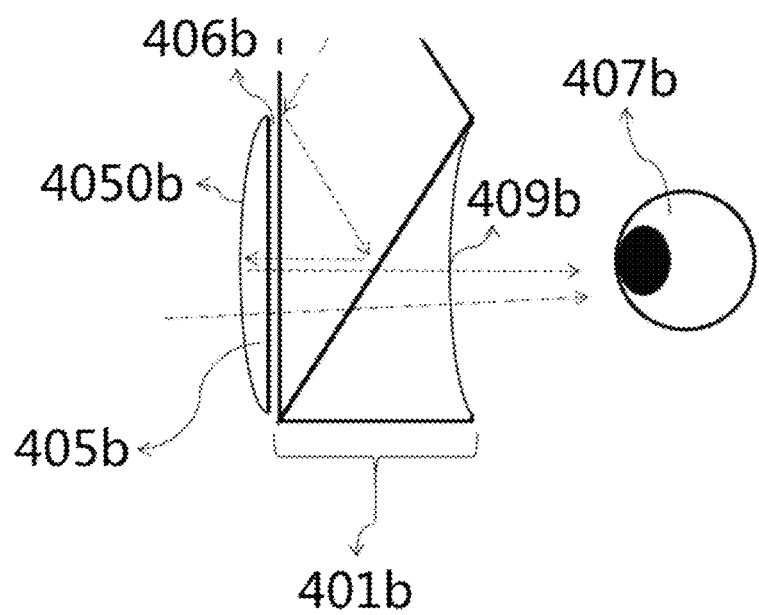

FIG. 4a to FIG. 4b are schematic diagrams showing that the total reflection prism in the compact near-eye display device with a large field of view angle based on total reflection according to the third embodiment of the present application includes a compensation surface.

The compensation surface is a curved surface, which is located on the side of the total reflection prism facing away from the near-eye refractive component, and adopts a curved surface (spherical surface, aspheric surface or other curved surfaces) to generate a certain diopter, which can be matched with the refractive surface of the near-eye refractive component, thereby performing refractive adjustment on internal display light and external ambient light and adapting to users with different eyesight.

As shown in FIG. 4a, a positive focal length lens 405a is used as a near-eye refractive component, so that the compensation surface 409a has a refractive reduction effect on the outer side to counteract the refractive magnification effect of the positive focal length lens 405a, so that the human eye 407a can see the outside world clearly.

Preferably, in order to adapt to users with different eyesight, the curvature of each optical surface can be adjusted or replaced: if the curvature of the compensation surface 409a is greater than the curvature of the refractive surface 4050a, the external diopter of the whole optical system is equivalent to a hyperopia lens; if the curvature of the compensation surface 409a is smaller than the curvature of the refractive surface 4050a, the external diopter of the whole optical system is equivalent to a myopia lens.

As shown in FIG. 4b, a refractive-reflective diopter 405b is used as a near-eye refractive component, so that the compensation surface 409b has a refractive reduction effect on the inside to counteract the refractive magnification effect of the refractive-reflective diopter 405b, so that the human eye 407b can see the outside world clearly.

Preferably, in order to adapt to users with different eyesight, the curvature of each optical surface can be adjusted or replaced: if the curvature of the compensation surface 409b is larger than that of the refractive surface 4050b, the external diopter of the whole optical system is equivalent to a hyperopia lens; if the curvature of the compensation surface 409b is smaller than the curvature of the refractive surface 4050b, the external diopter of the whole optical system is equivalent to a myopia lens.

Preferably, in order to further reduce the thickness of the near-eye diopter, the positive focal length lens 405a shown in FIG. 4a may be a fresnel lens or a positive focal length diopter with a diffraction microstructure; The refractive-reflective diopter 405b shown in FIG. 4b can adopt fresnel reflection surface or adopt some reflection diffraction microstructure to refract the internal display light under the condition of allowing the external light to pass through without refraction.

Example 4

This embodiment is a modified version of Embodiment 1.

FIG. 5a to FIG. 5d are schematic diagrams showing that the total reflection prism in the compact near-eye display device with a large field of view angle based on total reflection according to the fourth embodiment of the present application does not have a primary reflection surface.

Figure 5A:
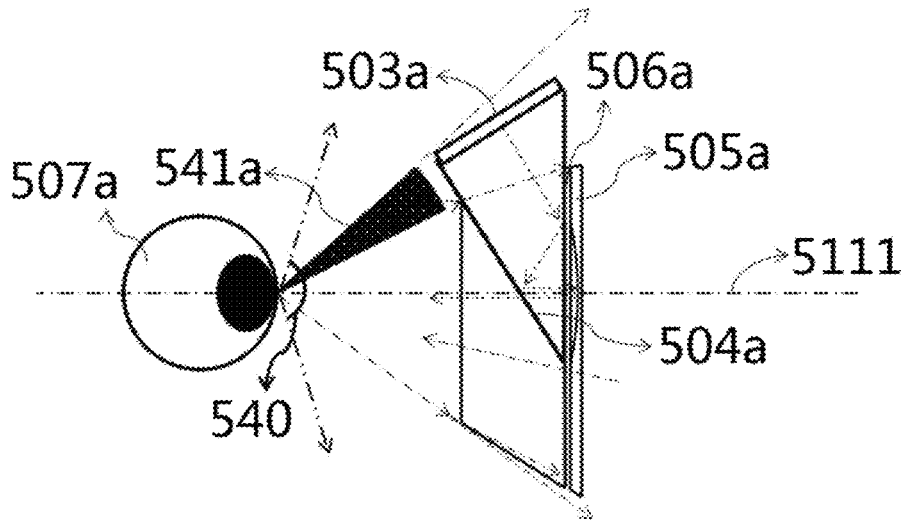
FIG. 5a to FIG. 5d are schematic diagrams showing that the total reflection prism in the compact near-eye display device with a large field of view angle based on total reflection according to the fourth embodiment of the present application does not have a primary reflection surface.

As shown in FIG. 5a, on the basis of embodiment 1, the primary reflection surface is removed, the image source 503a and the secondary reflection surface 504a are at about 90 degrees, and the image source 503a and the head-up visual axis 5111 of human eyes are at about 30 degrees, and a reflective refractive component 505a is adopted. Compared with embodiment 1, this scheme has the advantage that the image source 503a can be approximately parallel to the human eye's line of sight, so that the projection plane of the image source 503a in the natural visual angle 540 of the human eye is smaller, and the resulting visual field blocking area 541a is also smaller, thus forming a visual "narrow frame" effect.

Figure 5B:
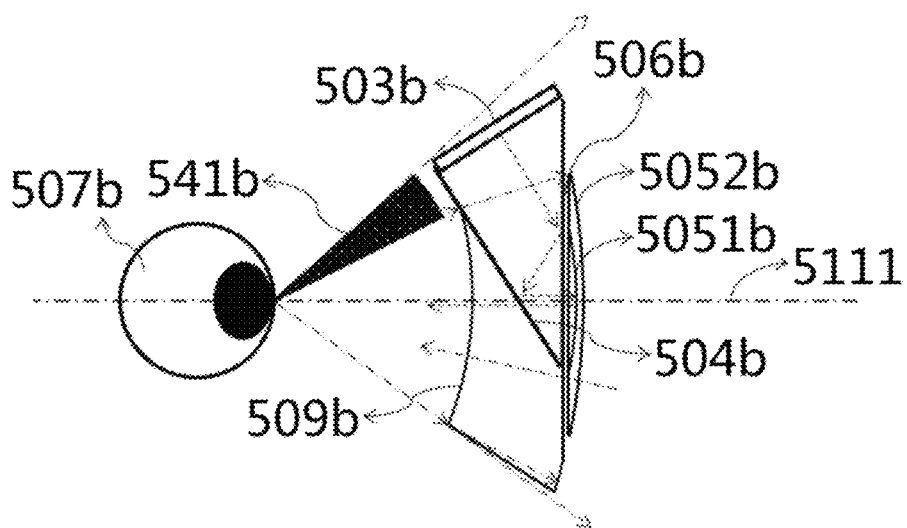

As shown in FIG. 5b, on the basis of FIG. 5a, a special refractive-reflective diopter and compensation surface 509b are used to make the refractive structure composed of compensation surface 509b and reflective inner refractive surface 5051b refract internally. The refractive structure composed of the compensation surface 509b and the refractive external refractive surface 5052b refracts the external refraction. When the diopters of the compensation surface 509b and the refractive outer refractive surface 5052b are combined differently, it can adapt to users with different eyesight.

Figure 5C:
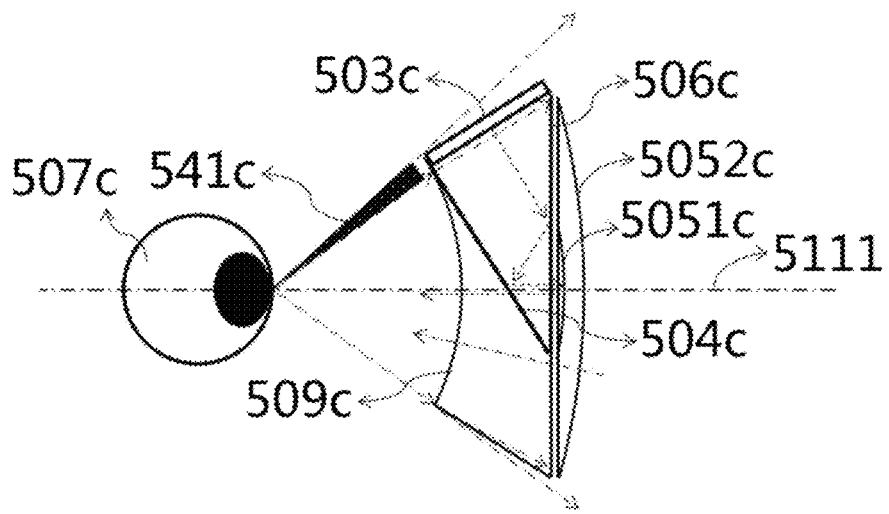

As shown in FIG. 5c, on the basis of FIG. 5b, the compensation surface 509c with smaller curvature can be used, so that the compensation surface 509c can extend close to the image source 503c, thereby further reducing the projection of the opaque surface, forming a smaller view blocking area 541c, and forming a better "narrow frame" effect.

Figure 5D:
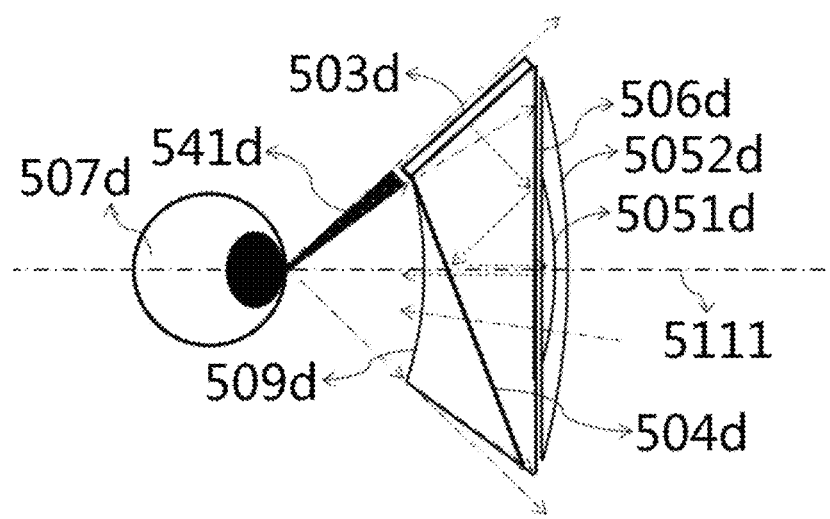

As shown in FIG. 5d, on the basis of FIG. 5c, the angle between the image source 503d and the head-up visual axis 5111 of human eyes is adjusted to be close to 45, and a similar "narrow frame" effect can also be achieved.

Example 5

FIG. 6a to FIG. 6d are schematic structural views of the near-eye display device according to the fifth embodiment of the present invention, which adopts two sets of total reflection optical systems respectively combined.

Figure 6A:
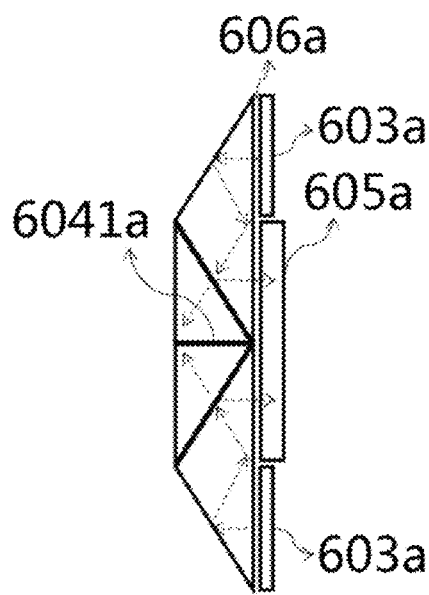
FIG. 6a to FIG. 6d are schematic structural views of the near-eye display device according to the fifth embodiment of the present invention, which adopts two sets of total reflection optical systems respectively combined.

In order to prevent crosstalk between the two sets of optical systems, optical path isolation is set between the two sets of total reflection prisms. There are four schemes for isolating the optical path:

As shown in FIG. 6a, polarization isolation layer 6041a is added to block light crosstalk.

Figure 6B:
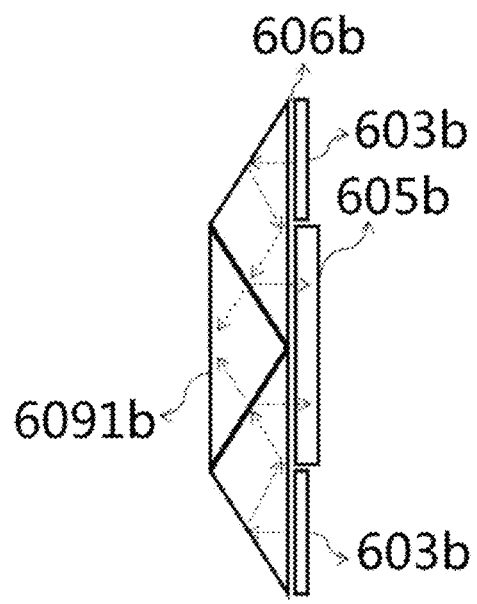
Figure 6C:
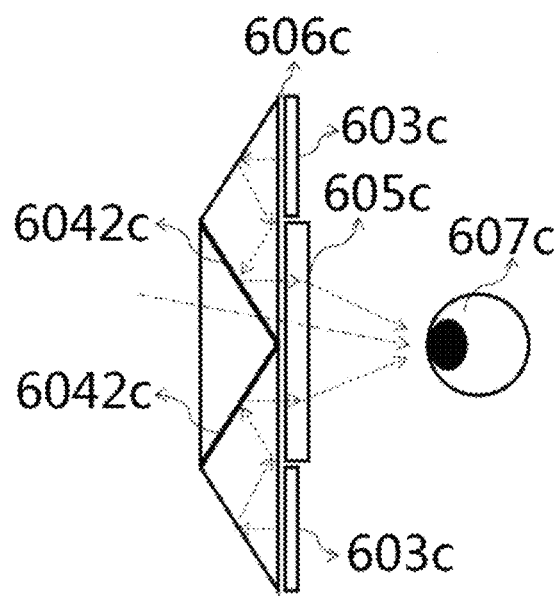
Figure 6D:
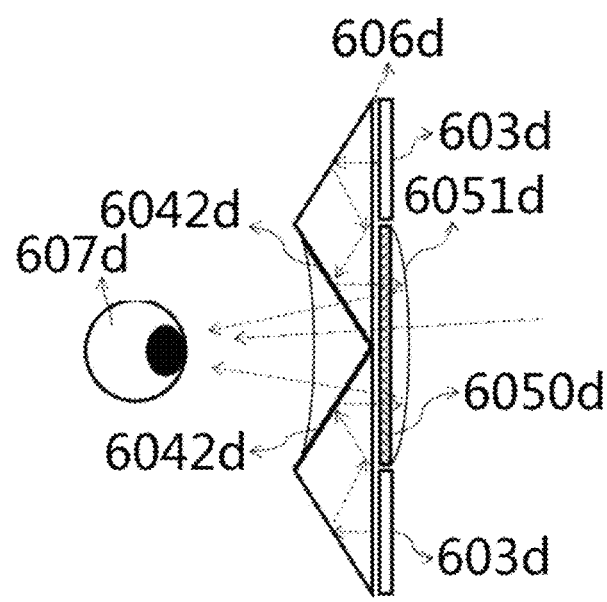

As shown in FIG. 6b, the anti-total reflection surface 6091b is adopted, such as coating an anti-reflection film on the surface, so that crosstalk rays cannot be totally reflected on the inner surface, so they cannot continue to propagate;

As shown in FIG. 6c, two polarization splitting layers 6042c with the same properties are adopted, so that after passing through one layer, the light cannot be reflected on the surface of the other layer, but will be transmitted;

As shown in FIG. 6d, when using the reflective refractive component 6051d, in order to ensure that the light passing through the component can pass through the polarization splitting layer 6042d, it is necessary to destroy (or change) the polarization of the light; a polarization changer 6050d (which can be a depolarization film, a quarter-wave plate, a half-wave plate, an inclined 45-degree polarizer and other materials that can change the original linear polarization of the light) can be used to process the light, and then it can be smoothly reflected into the human eye 607d.

Example 6

In this embodiment, two sets of total reflection optical systems are combined and respectively placed in front of people, that is, the near-eye display device includes two sets of total reflection prisms and two image sources which are respectively placed in front of people. Two sets of total reflection optical systems project light from different directions, and finally the two display images are spliced to achieve a larger field of view angle display effect.

Figure 7A:
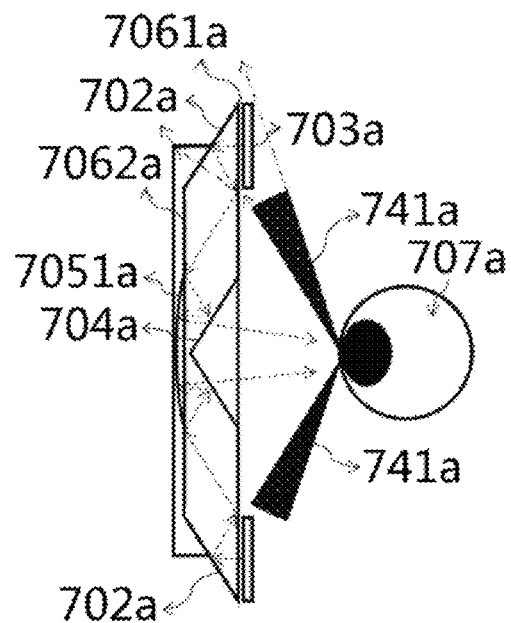
FIG. 7a to FIG. 7c are schematic structural diagrams of a narrow frame near-eye display device which adopts two sets of total reflection optical systems (including two total reflections) respectively combined according to the sixth embodiment of the present invention.
Figure 7B:
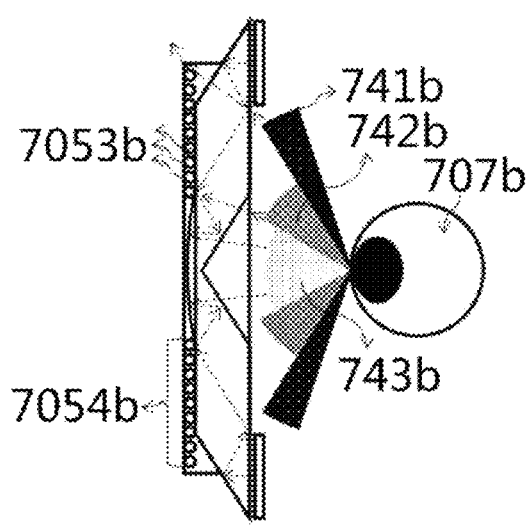
Figure 7C:
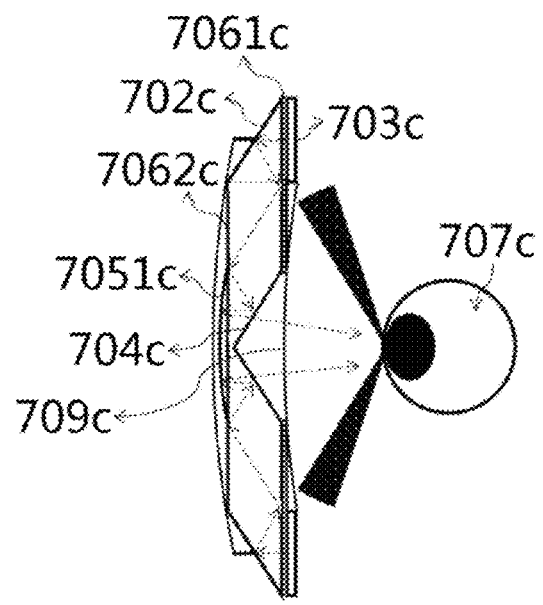

FIG. 7a to FIG. 7c are schematic structural diagrams of a narrow frame near-eye display device which adopts two sets of total reflection optical systems (including two total reflections) respectively combined according to the sixth embodiment of the present invention.

As shown in FIG. 7a, on the basis of embodiment 5, a total reflection optical system structure with twice total reflection is adopted, the primary reflection surface 702a is a semi-reflecting structure, and the reflective refractive surface 7051a is selected, so that the image source 703a is located at one side of the human eye 707a, through the special structural design as shown in the figure, the projection surface of the image source 703a in the human eye field can be made smaller and as far away from the center of the line of sight as possible, resulting in fewer visual field blocking areas 741a.

As shown in FIG. 7b, on the basis of FIG. 7a, a series of edge display luminous points 7053b (which can be LED, OLED or other self-luminous, light-guiding and light-reflecting devices) can be embedded in the transparent part of the lens to form an edge display luminous point array 7054b, which can display an image matching the central display area 743b. Since the luminous point array is sparse, external light can be allowed to pass through. The clarity of the displayed image is also very low, and the light-emitting source is too close to the human eye, so the display ambiguity is very high. Therefore, it can only be used to display very rough edge images and provide an edge-expanded visual field area 742b, thus expanding the visual perception area of the user and providing a more immersive visual experience.

As shown in FIG. 7c, the outer surface of the near-eye display device may be flat or curved, and the near-eye surface 709c may be flat or curved. In order to prevent crosstalk between the light rays of the two sets of optical systems, the near-eye surface 709c can be set as an anti-total reflection surface. The specific scheme is as follows: adding an anti-reflection film to prevent total reflection of the light rays on the inner surface, thus blocking the light rays from continuing to propagate; In addition, the combination of polarization splitting layer and polarization changer can also be used for optical path isolation (similar to FIG. 6d).

Example 7

Figure 8:
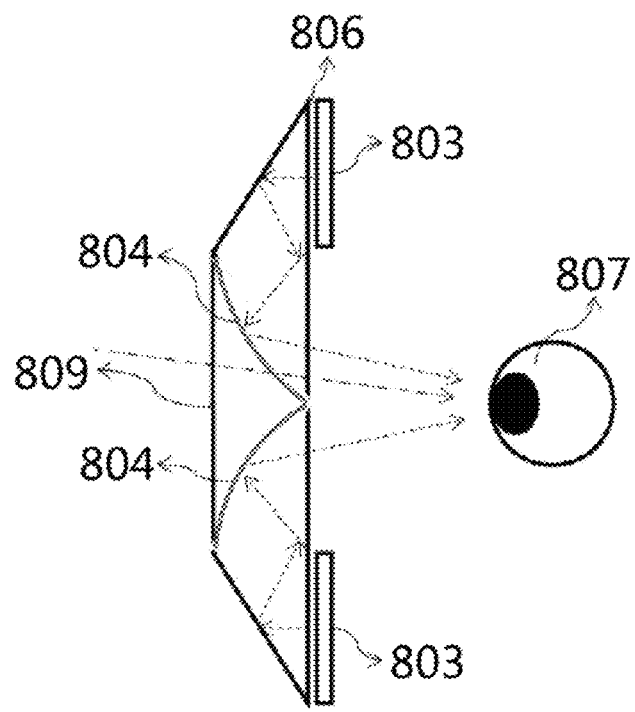
FIG. 8 is a schematic structural diagram of a near-eye display device which adopts two sets of total reflection optical systems (including curved secondary reflection surfaces) in the seventh embodiment of the present invention.

FIG. 8 is a schematic structural diagram of a near-eye display device according to the seventh embodiment of the present invention, which adopts two sets of total reflection optical systems (including curved secondary reflection surfaces 804).

Preferably, in order to prevent crosstalk between the light rays of the two optical systems, an anti-total reflection surface 809 may be provided.

Example 8

Figure 9:
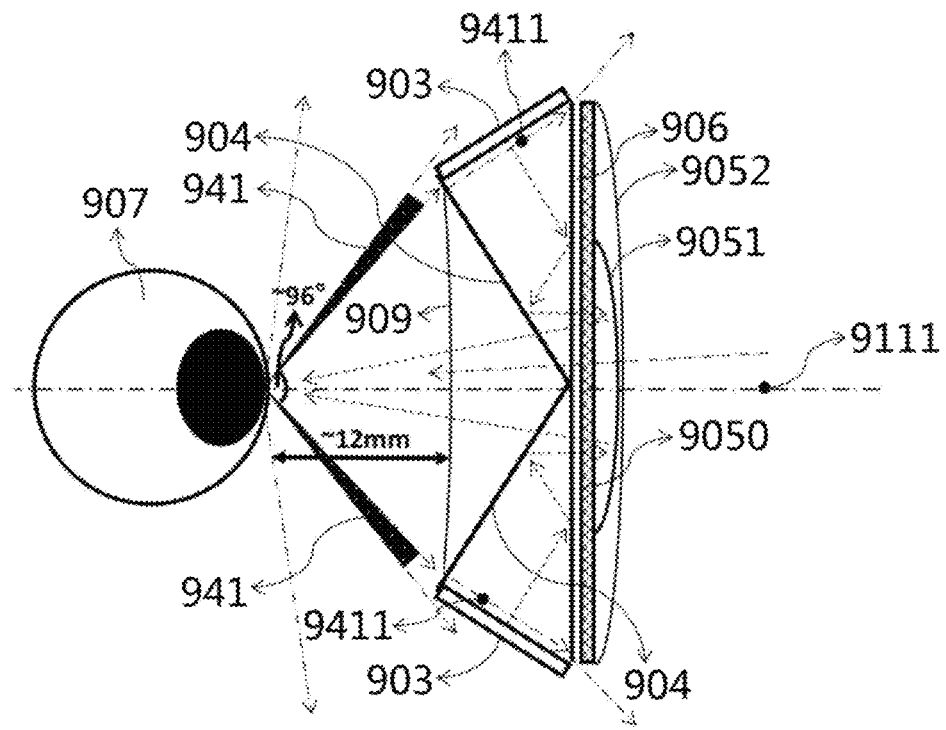
FIG. 9 is a specific structural schematic diagram of a narrow frame near-eye display device which adopts two sets of total reflection optical systems (excluding the primary reflection surface) according to the eighth embodiment of the present invention.

FIG. 9 is a specific structural schematic diagram of a narrow frame near-eye display device which adopts two sets of total reflection optical systems (excluding the primary reflection surface) according to the eighth embodiment of the present invention.

As shown in the figure, it is characterized in that, on the basis of Example 5, the primary reflection surface is removed, the image source 903 and the secondary reflection surface 904 (polarization splitting layer in this embodiment) are at about 90 degrees, the image source 903 is at about 30 degrees with the head-up visual axis 9111 of human eyes, the human eyes 907 are about 12 mm away from the optical system, and the corresponding longitudinal visual angle of the optical system is about 96 degrees, so that the edge line of sight 9411 refracted by the compensation surface 909 (assuming that the refractive index is 1.5, and the compensation surface 909 is planar) can be approximately parallel to the image source 903, thereby reducing the projection area of the image source 903 in the visual field of human eyes, reducing the visual field blocking area 941 of the user, forming a "narrow frame" glasses visual effect and ensuring the safety of the user. By changing the curvature (diopter) of the compensation surface 909 or the refractive surface 9052, the optical system can be adapted to users with different eyesight.

Similarly, in order to prevent crosstalk between the two sets of optical systems, the polarization splitting layer and polarization changer 9050 are used to isolate the optical path. In addition, the compensation surface 909 can also be set as an anti-total reflection surface, for example, an anti-reflection film is added to prevent the light from being totally reflected on the inner surface, thus blocking the light from continuing to propagate.

Similarly, similar to FIG. 7b, edge display luminous point arrays can also be added on the upper and lower sides of the central display area in this embodiment, so as to expand the visual perception area of the user.

Example 9

Figure 10A:
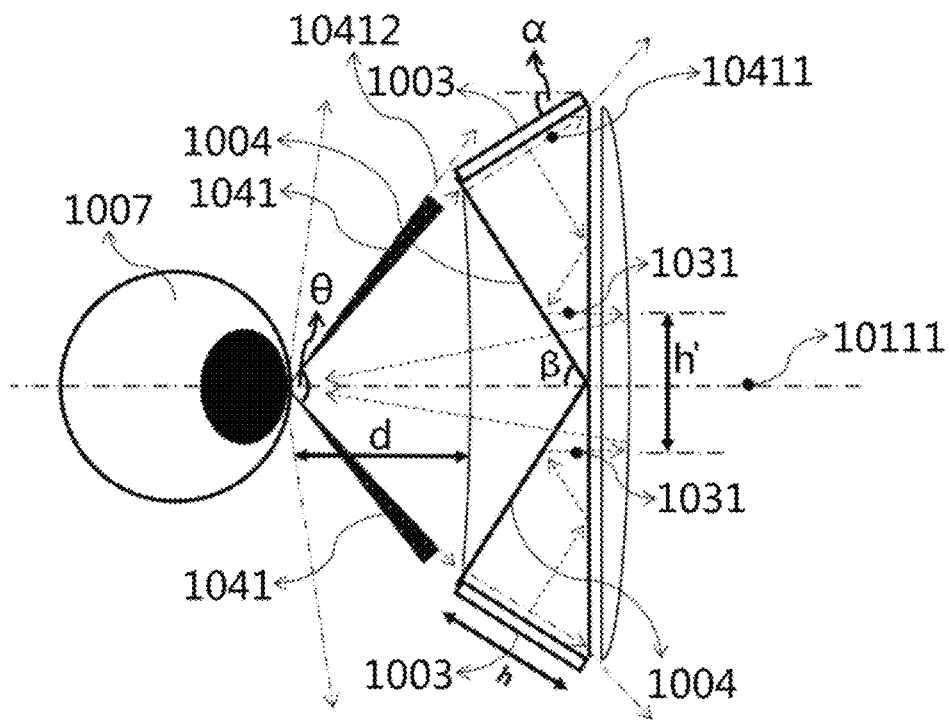
FIGS. 10a to 10b are general schematic diagrams showing the structure of a narrow frame near-eye display device which adopts two sets of total reflection optical systems (excluding the primary reflection surface) according to the ninth embodiment of the present invention.
Figure 10B:
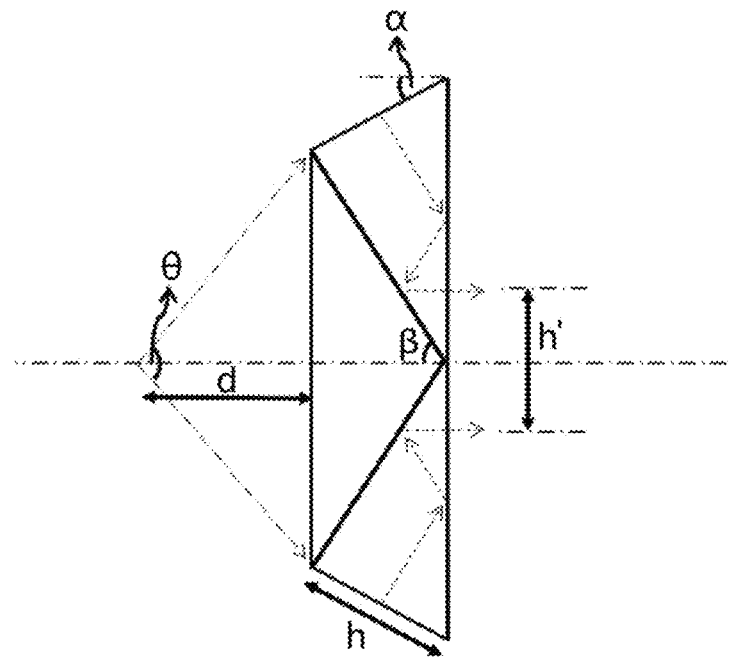

FIGS. 10a-10b are general schematic diagrams showing the structure of a narrow frame near-eye display device which adopts two sets of total reflection optical systems (excluding the primary reflection surface) according to the ninth embodiment of the present invention.

This embodiment is the general case of Embodiment 8. The actual situation is FIG. 10a, and the abstract relation is FIG. 10b.

In the near-eye display device, the distance between the human eye and the optical system is generally 12-25 mm, which is set as d, the refractive index of the material is n, the included angle between the image source 1003 and the head-up visual axis 10111 of the human eye is á, and the visual angle of the human eye is set as è.

When the following restrictions are met:

$$\arcsin[(\sin è/2)/n] \le á < è/2,$$

from which it can be ensured that the image source 1003 is always inside the included angle between the inner edge line of sight 10411 and the outer edge line of sight 10412, so that no additional line of sight blocking is generated, and a small field of view blocking area 1041 is maintained, thus forming a narrow frame glasses visual effect.

Let that include angle between the secondary reflection surface 1004 and the head-up visual axis 10111 of human eye be â, when the following restrictions are met:

$$â = 45° + á/2,$$

It can be ensured that the reflected light 1031 of the secondary reflection surface is approximately parallel to the head-up visual axis 10111 of human eyes.

The distance between the reflected light 1031 formed by the light rays emitted from the center of the image source 1003 in the upper and lower optical systems is h', and the width of the image source is h, which has the following geometric relationship:

$$h^*\cos á = [d^*\tan(è/2) + h^*\sin á - h/2/\sin á - h'/2]^*\tan á + [d^*\tan(è/2) - h'/2]/\tan â$$

from which it can be introduced that $$h^*[\cos á - \tan á^*\sin á + \tan á/2/\sin á] = d^*\tan(è/2)^*\tan á + d^*\tan(è/2)/\tan â - h'^*[\tan á/2 + 1/2/\tan á]$$

Substituting the actual data, we can calculate h',
when the following restrictions are met:

$$0.5h \le h' \le 0.85h,$$

It can ensure that the images displayed by the upper and lower sets of optical systems overlap in a small part in the sight of human eyes, and smooth transition can be realized through the special configuration of the two images.

Preferably, h'≈0.85h is considered. The following groups of preferential parameter configurations can be obtained:
 set á=45°, n=1.7, d=15 mm, è=90°, h=16.5, h'=13.5;
 or á=45°, n=1.50, d=12 mm, è=75°, h=10, h'=8.41;
 or á=30°, n=1.74, d=12 mm, è=100°, h=10.1, h'=8.4;
 or á=38°, n=1.60, d=15 mm, è=96°, h=14.3, h'=12.1;
 or á=50°, n=1.60, d=15 mm, è=100°, h=23.6, h'=20.3.

Example 10

Figure 11A:
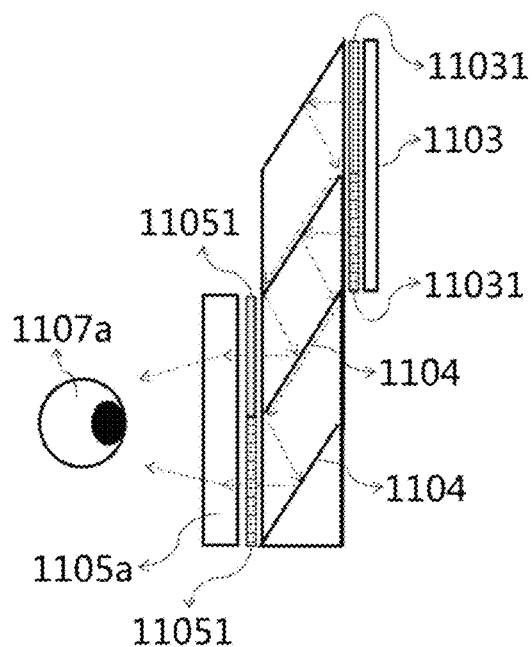
FIG. 11a to FIG. 11b show the structural schematic diagram of the near-eye display device according to the tenth embodiment of the present invention, which adopts the overlapping combination of two sets of total reflection optical systems (including two total reflections) with light from different regions of the image source.
Figure 11B:
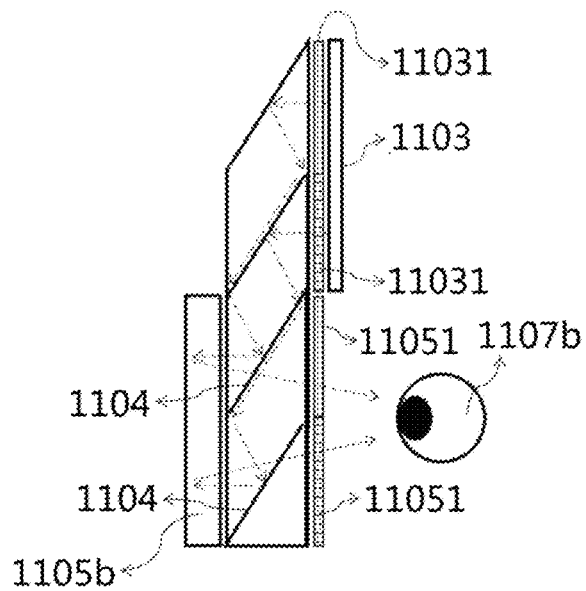

FIG. 11a to FIG. 11b show the structural schematic diagram of the near-eye display device according to the tenth embodiment of the present invention, which adopts the overlapping combination of two sets of total reflection optical systems (including two total reflections) with light from different regions of the image source.

As shown in FIG. 11a or 11b, the near-eye display device includes two sets of total reflection prisms (two sets of total reflection optical systems), which are combined by two sets of total reflection optical systems and placed in front of human eyes; the light polarization states of the two sets of total reflection optical systems are different (generally, they are two orthogonal linearly polarized lights, which are represented by two different types of arrow lines in the figure: "-". ⁻· ⁻· ⁻·" and dotted line "--------"), the two paths of light come from different areas of the same image source 1103, so that the light paths of the two sets of optical systems do not interfere with each other through the polarizer 11031 and polarization filter 11051, and finally the two display pictures are spliced to achieve a larger field of view angle display effect.

Preferably, in order to ensure smooth transition between the two images, the images reflected by the two secondary reflection surfaces 1104 should partially overlap, that is, the distance between the two secondary reflection surfaces 1104 should be smaller than that shown in FIG. 11a or 11b; or the two secondary reflection surfaces 1104 are not completely parallel, but are staggered by a certain angle (for example, 5-15 degrees).

Example 11

Figure 12A:
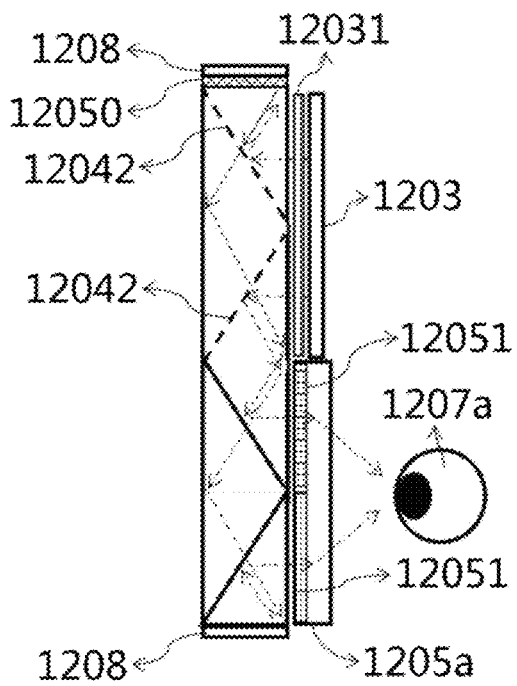
FIG. 12a to FIG. 12c show the structural schematic diagram of the near-eye display device according to the eleventh embodiment of the present invention, which adopts the overlapping combination of two sets of total reflection optical systems (including multiple total reflections) with light from different regions of the image source.
Figure 12B:
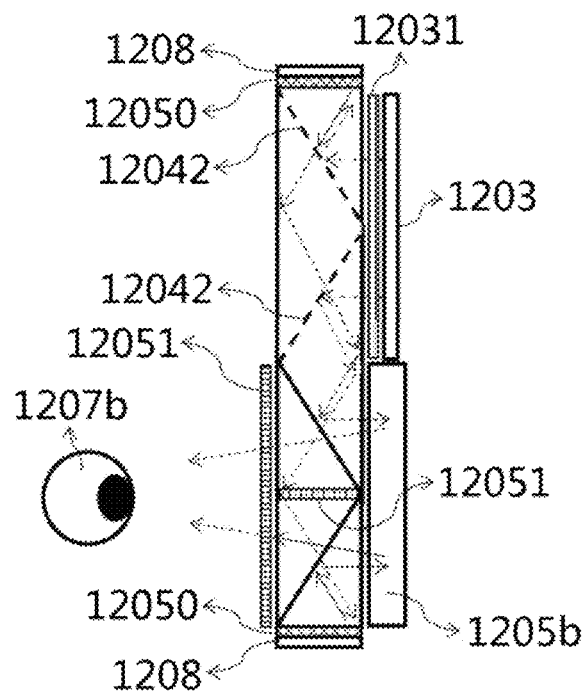
Figure 12C:
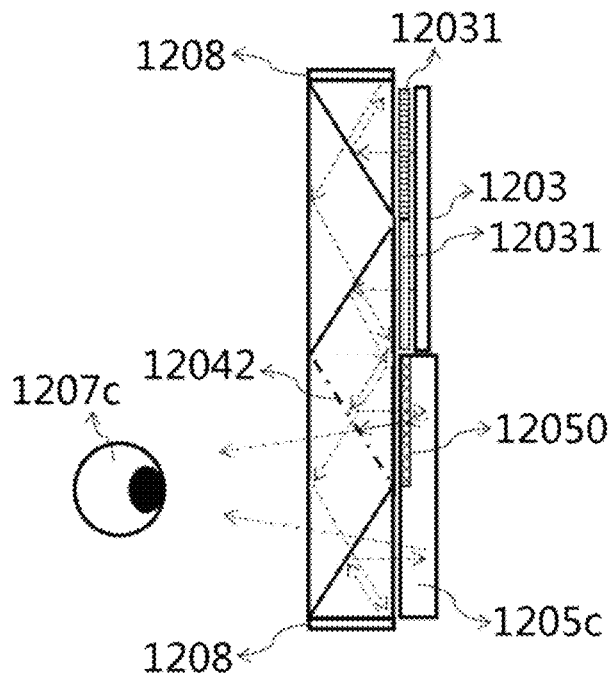

FIG. 12a to FIG. 12c show the structural schematic diagram of the near-eye display device according to the eleventh embodiment of the present invention, which adopts the overlapping combination of two sets of total reflection optical systems (including multiple total reflections) with light from different regions of the image source.

This embodiment is an improvement of Embodiment 10, which increases the number of total reflections and adds a plurality of end reflection surfaces 1208.

As shown in the figure, two sets of total reflection optical systems are combined and placed in front of human eyes; the polarization states of the two sets of total reflection optical systems are different (generally, they are two orthogonal linearly polarized lights, which are represented by two different types of arrow lines in the figure: "-". ⁻· ⁻· ⁻·" and dotted line "--------"), the two rays come from different areas of the same image source 1203. Through different combinations of polarizer 12031, polarization splitting layer 12042, polarization filter 12051 and polarization changer 12050, the optical paths of the two sets of optical systems do not interfere with each other, and finally the two display screens are spliced to achieve a larger field of view angle display effect.

Example 12

Figure 13A:
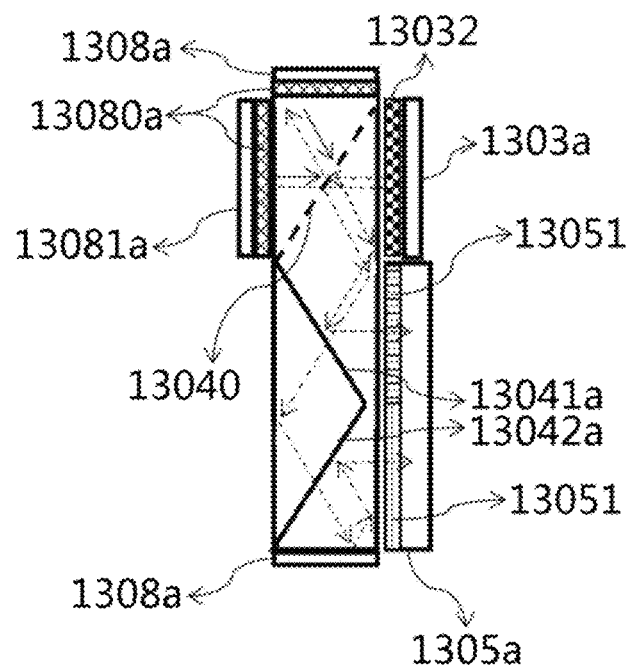
FIG. 13a to FIG. 13b show the structural schematic diagram of the near-eye display device according to the twelfth embodiment of the present invention, which adopts the overlapping combination of two sets of total reflection optical systems (including multiple total reflections) with light rays from the same area of the image source at different times.
Figure 13B:
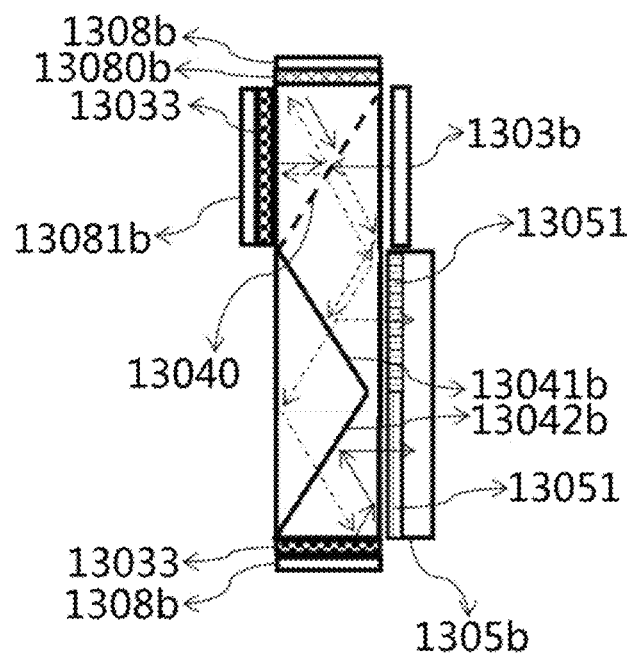

FIG. 13a to FIG. 13b show the structural schematic diagram of the near-eye display device according to the twelfth embodiment of the present invention, which adopts the overlapping combination of two sets of total reflection optical systems (including multiple total reflections) with light rays from the same area of the image source at different times.

In this embodiment, the near-eye display device includes two sets of total reflection prisms (two sets of total reflection optical systems), which are combined by two sets of total reflection optical systems and placed in front of human eyes; the polarization states of the two sets of total reflection optical systems are different, and the two paths of light come from different times in the same area of the same image source, thus generating two paths of light: FIG. 13a uses a fast switching polarization filter 13032, and FIG. 13b uses a fast switching shutter 13033. Through different combinations of polarization splitting layer 13040 or polarization filter 13051, the optical paths of the two sets of optical systems do not interfere with each other, and finally, the two display pictures are spliced to achieve a larger field of view angle display effect.

In FIG. 13a, a fast switching polarization filter 13032 is adopted, so that the light emitted by the image source 1303a is in two polarization states (generally two mutually orthogonal linearly polarized light, which is represented by two different types of arrow lines in the figure: "-". ⁻· ⁻· ⁻·" and the dotted line "--------"), in which one polarization state light (with a dash-dot line "⁻· ⁻· ⁻· ⁻·") only reflects on the surface of the polarization splitting layer 13040, but does not transmit. It undergoes total reflection twice downward, then reflects by the end reflection surface 1308a, then passes through the lower secondary reflection surface 13042a and enters the near-eye refractive component 1305a; it is totally reflected twice downward, reflected by the end reflecting surface 1308a, then passes through the lower secondary reflecting surface 13042a and enters the near-eye refractive component 1305a through the polarization filter 13051. The light with another polarization state (indicated by the dotted line "--- ") is only transmitted on the surface of the polarization splitting layer 13040, but is not reflected; the light ray passes through the light path adjusting reflecting surface 13081a, simultaneously passes through the polarization changer 13080a, then is reflected on the surface of the polarization splitting layer 13040, then is reflected through the end reflecting surface 1308a, simultaneously passes through the polarization changer 13080a, and then is transmitted through the polarization splitting layer 13040. At this time, the polarization state of the light is consistent with the light emitted from the image source, so the light can pass through the upper secondary reflection surface 13041a and then enter the near-eye refractive component 1305a through the polarization filter 13051.

In FIG. 11b, two fast switching shutters 13033 are used, which can determine whether light can pass through or not by fast switching. At a certain time, the upper fast switching shutter 13033 is opened (the lower fast switching shutter 13033 is closed), and the light emitted by the image source 1303b which passes through the polarization splitting layer 13040 can be reflected by the optical path adjusting reflection surface 13081b (at this time, the polarization of the light has changed), and then pass through the subsequent optical path similar to that in FIG. 11a, and enter the near-eye refractive component 13041b through the upper secondary reflection surface 13041b; at another time, the lower fast switching shutter 13033 is opened (the upper fast switching shutter 13033 is closed), and the light emitted from the image source 1303b passes through the polarization splitting layer 13040, undergoes total reflection twice downward, can be reflected by the end reflection surface 1308b (at this time, the polarization of the light has changed), and finally enters the near-eye refractive component 13051 through the lower secondary reflection surface 13042b.

Preferably, in FIG. 13a and FIG. 13b, the optical path adjusting reflective surfaces 13081a and 13081b are not closely attached to the surface of the total reflection prism, and their distance needs to be specially designed; for example, when the refractive index of the material is 1.5, the distance is about 0.3 times of the thickness of the total reflection prism, so as to ensure that the optical paths of the light rays of the two optical paths from the image source to the near-eye refractive component are approximately the same and the imaging planes are consistent.

Combined with the description and practice of the application disclosed herein, other embodiments of the application will be easily thought of and understood by those skilled in the art. The description and examples are to be regarded as exemplary only, and the true scope and spirit of the application are defined by the claims.

What is claimed is:

1. A compact near-eye display device with a large field of view angle based on total reflection, comprising:
    two sets of total reflection prisms and two image sources, wherein each of the two sets of total reflection prisms is configured for totally reflecting and conducting light emitted by a corresponding one of the two image sources for one or more times, and
    a near-eye refractive component for enlarging the image after one or more reflections of the light,
    wherein a gap layer exists between each of the two image sources and the near-eye refractive component and the total reflection prism, and the gap layer contains substances with a refractive index lower than that of the two sets of total reflection prisms, so that light is totally reflected and transmitted on an inner surface of each of the two sets of total reflection prisms,
    wherein the two sets of total reflection prisms and the two image sources are respectively placed in front of the human eyes, project light from different directions, and splice two displayed pictures to achieve a larger field of view angle display effect, and the two sets of total reflection prisms and the two image sources share a same set of the near-eye refractive component for enlarging images,
    wherein optical path isolation is arranged between the two sets of total reflection prisms in order to prevent crosstalk between the light of the two sets of total reflection prisms.

2. The near-eye display device according to claim 1, wherein each of the two sets of total reflection prisms comprises a primary reflection surface and a secondary reflection surface,
    the primary reflection surface forms an included angle of about 30 degrees with the image source, while the secondary reflection surface forms an included angle of about 30 degrees with the near-eye refractive component; and the image sources and the near-eye refractive component are placed in parallel.

3. The near-eye display device according to claim 1, wherein each of the two image sources is one or more imaging light-emitting devices selected from a liquid crystal display, a light-emitting diode display, an organic light-emitting diode display, a reflective display, a diffractive light source, a projector, a beam generator, a laser and a light modulator.

4. The near-eye display device according to claim 1, wherein the near-eye refractive component adopts a positive focal length lens, a reflective diopter, a polarized bifocal lens, a refractive reflective diopter or a polarized double reflective diopter.

5. The near-eye display device according to claim 4, wherein the near-eye refractive component allows external light to pass through without diopter, and a secondary reflection surface of each of the two sets of total reflection prisms is semi-reflective, so that a human eye is capable of seeing external environment through the near-eye refractive component and each of the two sets of total reflection prisms while seeing the displayed image clearly.

6. The near-eye display device according to claim 1, wherein each of the two sets of total reflection prisms comprises a compensation surface,
    the compensation surface is a curved surface and is located on a side of each of the two sets of total reflection prisms facing away from the near-eye refractive component, and the refractive surface of the near-eye refractive component is matched to perform refractive adjustment on internal display light and external environmental light.

7. The near-eye display device according to claim 1, wherein
    the two sets of total reflection prisms are overlapped and placed in front of the human eyes, and two paths of light from different areas of the same image source are spliced by two displayed pictures to achieve a larger field of view angle display effect.

8. The near-eye display device according to claim 1, wherein
two paths of light at different times from the same area of the same image source are spliced by two displayed pictures to achieve a larger field of view angle display effect.

\* \* \* \* \*